United States Patent [19]

Johannessen

[11] 3,786,334

[45] Jan. 15, 1974

[54] MAGNETIC PULSE COMPRESSION RADIO-FREQUENCY GENERATOR APPARATUS

[75] Inventor: Paul R. Johannessen, Lexington, Mass.

[73] Assignee: Megapulse Incorporated, Waltham, Mass.

[22] Filed: Aug. 12, 1971

[21] Appl. No.: 171,174

[52] U.S. Cl. .......... 321/45 R, 307/88 MP, 307/107, 307/108, 321/27 R

[51] Int. Cl. .......... H02m 7/52

[58] Field of Search .......... 321/2, 27 R, 45 R, 321/47; 331/117; 328/27; 307/107, 108, 88 MP

[56] References Cited

UNITED STATES PATENTS

| | | | |
|---|---|---|---|
| 2,869,004 | 1/1959 | Melville | 307/108 |
| 3,211,915 | 10/1965 | Pochlman et al. | 307/106 X |
| 3,193,693 | 7/1965 | Daykin | 307/88 MP |
| 3,323,076 | 5/1967 | Pelly | 321/45 R |
| 3,422,341 | 1/1969 | Kurimura et al. | 323/89 R |
| 3,290,581 | 12/1966 | Hooper | 321/45 R |

FOREIGN PATENTS OR APPLICATIONS

| | | | |
|---|---|---|---|
| 1,058,839 | 2/1967 | Great Britain | 321/45 R |
| 1,136,376 | 12/1968 | Great Britain | 321/45 R |

*Primary Examiner*—A. D. Pellinen
*Attorney*—Rines and Rines and Shapiro and Shapiro

[57] ABSTRACT

Magnetic pulse compression radio-frequency generators involving preferably SCR-controlled sequential inverters connected with magnetic pulse compression circuits feeding a common output load.

7 Claims, 2 Drawing Figures

PATENTED JAN 15 1974 3,786,334

SHEET 1 OF 2

MAGNETIC PULSE COMPRESSION RADIO-FREQUENCY GENERATOR APPARATUS

Figure 1:
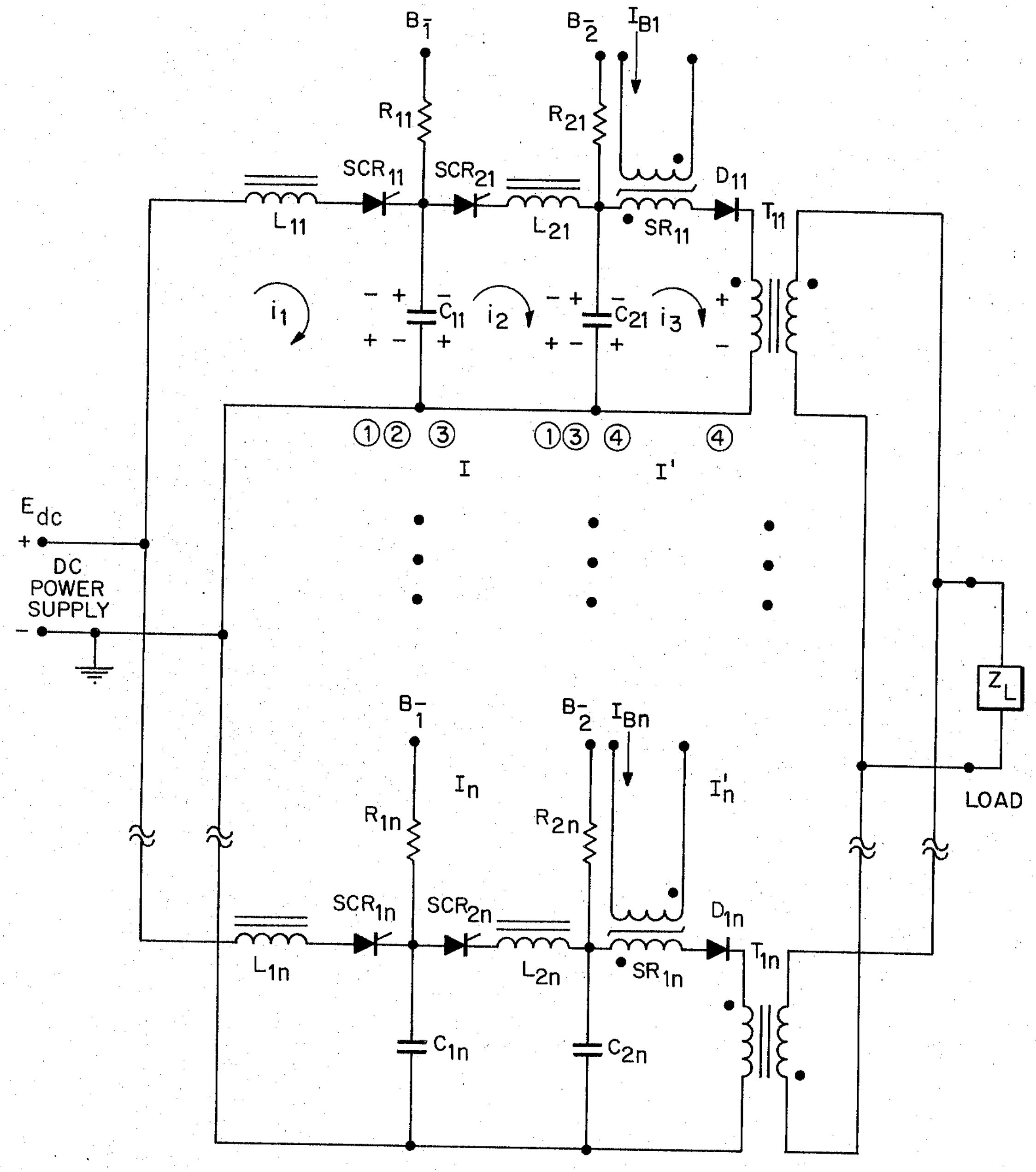

The present invention relates to methods of and apparatus for radio-frequency pulse compression, being more particularly directed to magnetic pulse-compression radio-frequency generators employing pulsed sequential techniques.

The generation of radio-frequency power by the pulsed sequential technique underlying the present invention is described in U.S. Letters Pat. No. 2,786,132, issued Mar. 19, 1957, to Robert H. Rines. Relatively recent embodiments of the same using silicon-controlled rectifiers (SCRs) for radio frequency are described in U.S. Letters Pat. No. 3,243,728, issued Mar. 29, 1966 to G. R. Brainerd et al.

The pulsed sequential technique and type of basic apparatus described in the said Rines patent is often referred to as the "sequential inverter," and is particularly useful when employing SCRs in the frequency range above approximately 20 kHz. The basic reason for using the sequential method when employing SCRs resides in the long recovery time compared to the turn-off time of these devices.

A basic problem with the SCR sequential inverter, however, is the *di/dt* (rate of change of forward current) rating. Because *di/dt* is proportioned to frequency, the pulse current rating of SCRs is greatly reduced at high frequencies. This decreased rating starts at about 10 kHz for high-current SCRs. It is known that by the use of magnetic pulse compression techniques, SCRs used in other applications can be operated at maximum pulse current rating; for example, for applications above 100 kHz, an order of magnitude increase in output power can, indeed, be thus obtained. Conventional magnetic pulse compression circuits, however, unfortunately cannot be used in sequential inverter applications. The output of an individual pulse compression circuit is a unipolar or DC pulse; whereas, the output of a sequential inverter is of alternating polarity. In order to obtain the alternating polarity output and to generate the sequential pulse train, the pulse generators are connected in parallel at the output. But the interaction resulting from this interconnection has heretofore made the use of ordinary magnetic pulse compression networks impossible in these applications.

Underlying the present invention is the discovery of a new type of magnetic pulse compression apparatus and method that has obviated the above problems and has overcome the impossibility of compatable use of the same in sequential inverter systems; this, therefore, being a primary object of the invention.

A further object is to provide a novel radio-frequency generating apparatus.

Other and further objects will be explained hereinafter and are more particularly delineated in the appended claims.

In summary, however, the invention embraces sequential inverters, preferably SCR-controlled, connected with corresponding magnetic pulse compression circuits in a novel compatable way to enable feeding a common load without interaction.

The invention will now be described with reference to the accompanying drawing,

FIG. 1 of which is a schematic circuit diagram of a preferred embodiment; and

Figure 2:
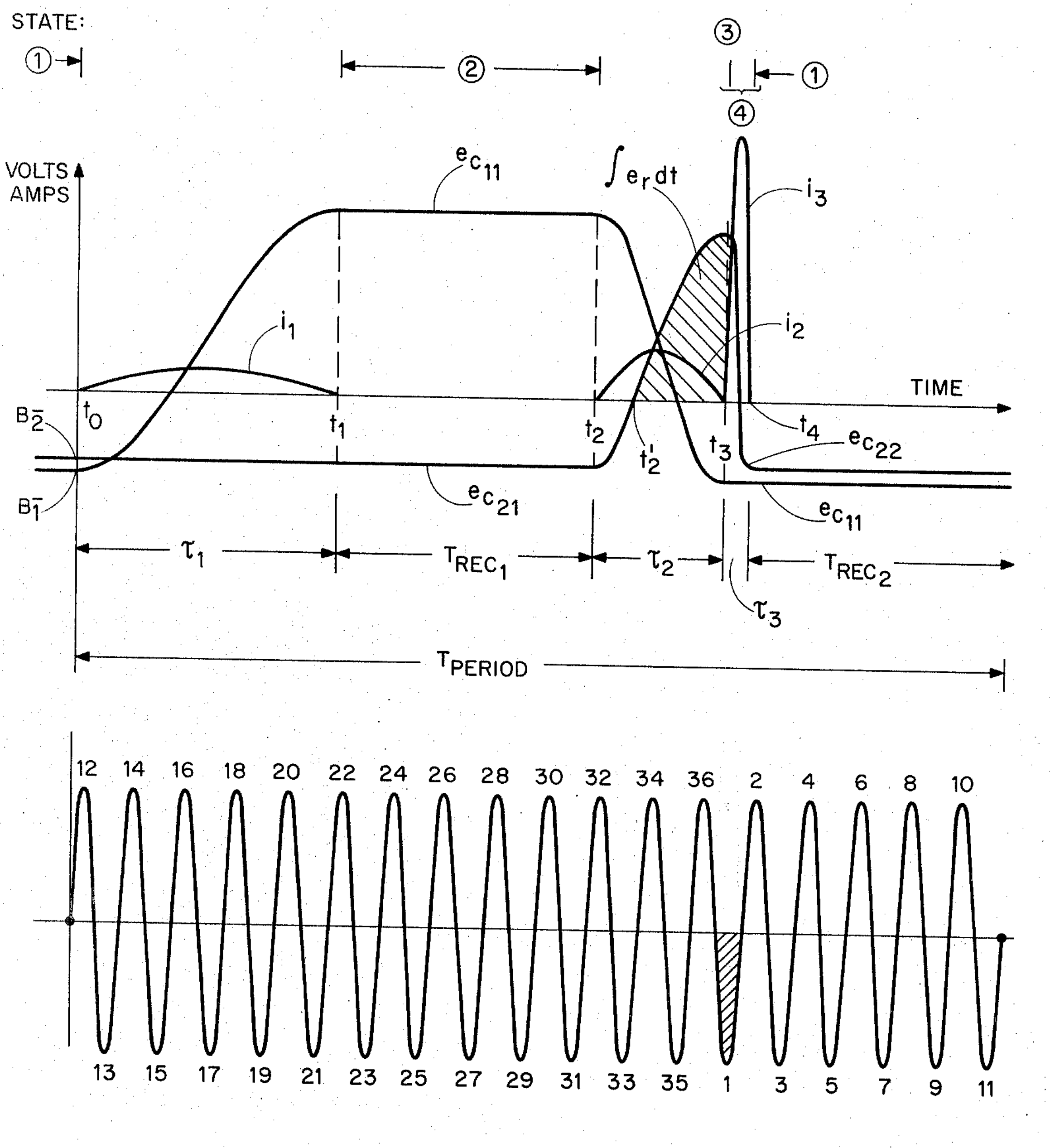

FIG. 2 is an explanatory waveform diagram illustrating voltage and current waveforms of the magnetic pulse compression generator apparatus of FIG. 1.

In accordance with the invention, a novel magnetic SCR pulse compression circuit is used that has been found to have a low output impedance during the interval of output pulse generation, and a high impedance during the interval between output pulses. Thus, no deleterious interaction effects, before discussed, can take place between the pulse circuits, and they can fortuitously be connected together at the output without mutual interaction for such purposes as employment in sequential inverters. A preferred embodiment of this magnetic pulse compression network is shown in FIG. 1, comprising SCR charging circuits I through $I_n$ connected in cascade with and followed by respective magnetic pulse compression circuits I' . . . $I'_n$. Any plurality or number *n* of similar SCR charging circuits and magnetic pulse compression circuits can be used; but the two circuit system shown in FIG. 1 has the minimal number of SCR charging and magnetic pulse compression circuits for the practice of the invention.

The SCR charging circuits at successive locations I . . . $I_n$ are shown similarly constructed, each provided with respective series input inductances $L_{11}$ and $L_{1n}$ and trigger-activated SCRs, indicated at $SCR_{11}$ and $SCR_{1n}$, connected with the positive terminal + of a DC power supply source $E_{dc}$. First energy storage charging circuits are provided by the elements $L_{11}$ — $SCR_{11}$ and $L_{1n}$ — $SCR_{1n}$ in combination with respective capacitors $C_{11}$ and $C_{1n}$, each returned to the negative terminal — of the source $E_{dc}$. Second charging circuits are connected to follow the first charging circuits, comprising respective SCRs indicated at $SCR_{21}$ and $SCR_{2n}$, series inductances $L_{21}$ and $L_{2n}$, and capacitors $C_{21}$ and $C_{2n}$. Respective pulse compression reactors $SR_{11}$ and $SR_{1n}$ provided with respective diodes $D_{11}$ and $D_{1n}$ are connected to the second charging circuits of the circuits I . . . $I_n$, and feed the load $Z_L$ through respective output transformers $T_{11}$ . . . $T_{1n}$.

The basic operation of this SCR-magnetic pulse compression circuit will now be explained with the aid of the voltage and current waveforms shown in FIG. 2, and, for illustrative purposes, in connection with circuits I — I', it being understood that the other similar circuits of the sequential inverter-pulse compression system operate similarly. Initially, the capacitors $C_{11}$ and $C_{21}$ are charged to negative voltages $B_1-$ and $B_2-$, through corresponding resistances $R_{11}$ and $R_{21}$, respectively, where $B_1-$ is greater in magnitude than $B_2-$. At time $t_o$ (FIG. 2), a trigger signal is applied to $SCR_{11}$, and capacitor $C_{11}$ is resonantly charged to a voltage slightly less than $2E_{dc} + B_1-$. The deviation from this value (which represents the loss-less charging case) results from losses in the inductor $L_{11}$, the $SCR_{11}$ and the capacitor $C_{11}$ during the energy storage charging. The time interval of charging $C_{11}$ is labeled $\tau_1$, and it will be seen that the charging current $i_1$, is half a sine wave and that the voltage on $C_{11}$ is a negative cosine wave offset by approximately $E_{dc}$—½ ($B_1$—). The time interval $\tau_1$ is equal to one-half the period of the resonance frequency $\sqrt{1/L_{11}C_{11}}$. The charge condition is illustrated by + and − signs in FIG. 1 adjacent capacitors $C_{11}$ and $C_{21}$ (and $C_{1n}$ and $C_{2n}$) in vertical alignment with the state number ①. This charging period ends at time $t_1$ and the circuit remains idle during the time interval labelled as state ②.

During this time interval, $SCR_{11}$ is reversely biased, the interval lasting for a time $T_{REC_1}$ which is sufficient to allow the SCR to recover to the "off state." For ordinary SCRs, this time is of the order of 40 to 50 μsec; and for fast-recovery SCRs, this time may be reduced to 10 to 20 μsec. The recovery interval ends at time $t_2$, when $SCR_{21}$ is rendered conductive or turned on by means of a trigger signal, such as of the sequential type described in the before-mentioned Letters Patent. The charge on $C_{11}$ is accordingly discharged or transferred to $C_{21}$, and vice versa. This interchange of charge is perfect if the capacitors have the same capacitance value and if no loss takes place during charge transfer. The interval of charge interchange is labeled $\tau_2$ in FIG. 2 and its length is determined by two considerations: first, the optimizing of the pulse current capability of the $SCR_{21}$; and secondly, the minimizing of the magnetic pulse compression required of the saturable reactor $SR_{11}$ of the following magnetic pulse compression circuit I'. As shown, $\tau_2$ is somewhat smaller than $\tau_1$, though this is not always necessary.

Prior to interval $\tau_2$, the saturable reactor $SR_{11}$ which typically may consist of a magnetic toroidal core with rectangular hysteresis loop (i.e., 51% iron, 50 % nickel), such as those marketed under the trade names Deltamax or Orthonol, is biased into negative saturation by the bias current $I_{B1}$ applied to the upper winding of reactor $SR_{11}$, as is well known. During the interval $\tau_2$, the voltage on capacitor $C_{21}$ reverses polarity and becomes positive at $t_2'$. In the time interval from $t_2'$ to $t_3$, the voltage on capacitor $C_{21}$ is positive, and the shaded volt-time area, labeled $\int e_r dt$ in FIG. 2, drives the saturable reactor $SR_{11}$ from negative to positive saturation. It should be noted that the volt-time integral is proportional to the magnetic flux in the core. At time $t_3$, the saturable reactor $SR_{11}$ saturates and becomes a very low inductance. Thus, the charge on capacitor $C_{21}$ discharges very rapidly into the load during the relatively short time interval labeled $\tau_3$ at state ③. Again, the charge condition is shown on the capacitors vertically above the state ③ notation in FIG. 1. This corresponds to the shaded negative output pulse between oscillations 36 and 2 (state ④) in the lower waveform of FIG. 2. The resulting pulse compression is represented by the ratio $\tau_2/\tau_3$.

The output stage is designed such that the resonant circuit formed by capacitor $C_{21}$, the saturated inductance of $SR_{11}$ and the load is underdamped. The voltage on capacitor $C_{21}$ therefore reverses polarity, and when the load current $i_3$ becomes zero at time $t_4$, the diode $D_{11}$ is back-biased and thereby presents a high impedance to the load. Isolation between pulse circuits is thereby obtained. It should further be observed that the reverse voltage $e_{C21}$ is slightly smaller than $e_{C11}$, thereby insuring that $SCR_{21}$ is reversely biased so that it can recover.

When $SCR_{21}$ has recovered during period $T_{REC_2}$, the pulse circuit again is ready to start the generation of an output pulse. Thus, the period of operation ($T_{period}$) of the pulse circuit is the sum of the time intervals $\tau_1$, $T_{REC_1}$, $\tau_2$, $\tau_3$, and $T_{REC_2}$. The number of pulse circuits n required to generate a continuous wave (C.W.) by sequential discharging of stored energy at successive locations I — I' . . . $I_n$ — $I_n'$, is equal to the ratio of $T_{period}$ to $\tau_3$.

If the pulse circuits are operating into a high Q load $Z_L$ and amplitude ripple on the output waveform is acceptable, then the pulse circuits need not generate every half-cycle. In this manner, the number of pulse circuits may be reduced. These pulse circuits may also be used to generate RF pulses with prescribed shape such as used in Loran navigation systems and the like, in which cases, the number *n* of pulse circuits is determined by the length and shape of the RF pulse.

Further modifications will also occur to those skilled in this art, and all such are considered to fall within the spirit and scope of the invention as defined in the appended claims.

What is claimed is:

1. Magnetic pulse compression radio-frequency generator apparatus having, in combination, sequential inverter means having a plurality of energy storage and discharge circuits disposed at a plurality of locations, each such circuit being provided with a magnetic pulse compression circuit, means for connecting all of the plurality of magnetic pulse compression circuits to a common load, and means comprising gated trigger means connected in each energy storage and discharge circuit for controlling the impedance of the corresponding magnetic pulse compression circuit in order to generate sequential compressed pulses in the plurality of magnetic pulse compression circuits for application to the said common load, the storage circuits of said sequential inverter means each comprising cascaded first and second resonant charging circuits each provided with said gated trigger means for controlling the transfer of the charge stored therein, said trigger means of said second resonant charging circuit having DC power supply means for reverse biasing the last-mentioned trigger means to maintain the same non-conductive for a period of time after it has been rendered conductive.

2. Apparatus as claimed in claim 1 and in which each of the second charging circuits is connected with a corresponding one of the magnetic pulse compression circuits comprising a saturable reactor, diode and output transformer.

3. Apparatus as claimed in claim 2 and in which means is provided for first triggering the trigger means of the said first resonant charging circuit of each energy storage circuit to effect charging energy storage therein for a period $\tau_1$, then triggering the trigger means of the said second charging circuit for further storage during a period $\tau_2$, means operable during the period $\tau_2$ for reducing the impedance of the magnetic pulse compression circuit to a low value, and means for therefor discharging the further stored energy from the second charging circuit through the low impedance magnetic pulse compression circuit to said common load in a period $\tau_3$ shorter than $\tau_2$ and $\tau_1$.

4. Apparatus as claimed in claim 3 and in which said trigger means comprises SCR devices.

5. Apparatus as claimed in claim 1 and in which the first resonant charging circuit comprises an inductance, a semiconductor controlled rectifier, and a capacitance in series across a source of energy, the second resonant charging circuit comprises a semiconductor controlled rectifier, an inductance, and a capacitance in series across the first-mentioned capacitance, and each of said magnetic pulse compression circuits comprises a saturable reactor in series with a rectifier across the second-mentioned capacitance.

6. Apparatus as claimed in claim 5 and in which said DC power supply means comprises means connected to said capacitances for charging said capacitances to voltages which are of polarity opposite to the polarity of the voltage to which the first-mentioned capacitance is charged by said source and which are of relative magnitude to apply a reverse voltage to the last-mentioned trigger means.

7. Apparatus as claimed in claim 1 and in which each of said magnetic pulse compression circuits comprises a saturable reactor in series with a rectifier and said controlling means comprises means for reducing the series impedance of said reactor and said rectifier to a low value for discharging the stored energy through the pulse compression circuit to said load and for thereafter back-biasing said rectifier to isolate the pulse compression circuit from the load.

* * * * *